(12) United States Patent
Sorensen (10) Patent No.: US 11,714,894 B2
(45) Date of Patent: Aug. 1, 2023

(54) AUTHENTICATING CLIENT APPLICATIONS USING AN IDENTITY FABRIC BLOCKCHAIN

(71) Applicant: FMR LLC, Boston, MA (US)

(72) Inventor: Carolyn Manis Sorensen, Park City, UT (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/547,959

(22) Filed: Dec. 10, 2021

(65) Prior Publication Data

US 2023/0185894 A1    Jun. 15, 2023

(51) Int. Cl.
G06F 21/44    (2013.01)
H04L 9/30     (2006.01)
H04L 9/40     (2022.01)
H04L 9/00     (2022.01)

(52) U.S. Cl.
CPC ............ *G06F 21/44* (2013.01); *H04L 9/3073* (2013.01); *H04L 63/08* (2013.01); *H04L 9/50* (2022.05)

(58) Field of Classification Search
CPC ........ G06F 21/44; H04L 9/3073; H04L 63/08
USPC ........................................................... 726/7
See application file for complete search history.

(56) References Cited

U.S. PATENT DOCUMENTS

| | | | |
|---|---|---|---|
| 10,685,099 B2 | 6/2020 | Chen et al. | |
| 10,922,631 B1 * | 2/2021 | Shahidzadeh | H04W 4/029 |
| 11,093,933 B1 * | 8/2021 | Peng | H04L 63/101 |
| 11,546,321 B2 * | 1/2023 | Jen | H04L 9/0822 |
| 2013/0311768 A1 * | 11/2013 | Fosmark | G06Q 20/027 |
| | | | 713/170 |
| 2020/0036707 A1 * | 1/2020 | Callahan | H04L 67/53 |
| 2020/0127828 A1 | 4/2020 | Liu et al. | |

(Continued)

FOREIGN PATENT DOCUMENTS

WO    2020098844 A2    5/2020

OTHER PUBLICATIONS

Fedrecheski et al., "Self-Sovereign Identity for IoT Environments: A Perspective," Berkeley Wireless Research Center, Electrical Engineering and Computer Science Department, University California, 6 pages, Mar. 11, 2020.

(Continued)

*Primary Examiner* — Dant B Shaifer Harriman
(74) *Attorney, Agent, or Firm* — Cesari & McKenna, LLP (57) ABSTRACT

Methods and apparatuses are described for authenticating client applications using an identity fabric blockchain. A server receives a first registration request from a first client application. The server generates a first decentralized identifier corresponding to the first client application and stores the first identifier in an identity fabric blockchain. The server receives a second registration request from a second client application, generates a second decentralized identifier corresponding to the second client application, and stores the second identifier in the blockchain. The server receives a first authentication request from a first resource and authenticates the first client application based on the first authentication request and the first decentralized identifier stored in the blockchain. The server receives a second authentication request from a second resource and authenticates the second client application based on the second authentication request and the second decentralized identifier stored in the blockchain.

14 Claims, 5 Drawing Sheets

(56) References Cited

U.S. PATENT DOCUMENTS

2020/0304315 A1* 9/2020 Li .................. H04L 9/3236
2021/0377254 A1* 12/2021 Avetisov ............ H04L 67/133
2022/0006634 A1* 1/2022 Ferenczi ............ H04L 9/3247

OTHER PUBLICATIONS

Gisolfi, "Decentralized Identity: An alternative to password-based authentication," Blockchain Pulse: IBM Blockchain Blog, Oct. 5, 2018, https://www.ibm.com/blogs/blockchain/2018/10/decentralized-identity-an-alternative-to-password-based-authentication/, 11 pages.

* cited by examiner

AUTHENTICATING CLIENT APPLICATIONS USING AN IDENTITY FABRIC BLOCKCHAIN

TECHNICAL FIELD

This application relates generally to methods and apparatuses, including computer program products, for authenticating client applications using an identity fabric blockchain.

BACKGROUND

Generally, application programming interface (API) security implementations rely on the OAuth 2.0 Authorization Framework (described at datatracker.ietf.org/doc/html/rfc6749) or API Keys (described at swagger.io/docs/specification/authentication/api-keys/) for creating and verifying tokens that represent the identity of a calling software application. Most of these implementations rely on a shared secret to be established between the calling application and the resource server (or a gateway protecting the resource server). Although the approach with shared secrets is easy for developers to implement and use, operationally it is very difficult to maintain securely over time and across a large network of resources and applications, especially as applications grow more complex and may include resources from multiple sources. Consider an enterprise that has thousands of API products that are offered to thousands of client applications—the cost overhead for maintaining the access controls and protecting those secrets requires extensive access management, monitoring, auditing and presents a significant operational risk to the enterprise if the secrets fall into the wrong hands or if access is blocked because changes to the API key or secret is not replicated universally.

In one example, a calling application may call a plurality of resources each governed by a different authorization server. Under this scenario, existing API security implementations would have to maintain a shared secret and a token for each resource/authorization server separately. As can be appreciated, the operational difficulties for this model include but are not limited to the following:

- Maintaining shared secrets between the calling application and the authorization server is difficult to do consistently and securely;
- Operational responsibility becomes complex and usually manual (e.g., developer registers the application at the authorization server via an admin console);
- Maintaining the right access to the admin console over time is challenging for enterprises, with a high risk for insider threat, and risk for access loss if the original developer leaves;
- Creating processes to get the secret from the admin console and onto the calling application workload without exposing the secret can be challenging;
- Errors frequently happen where secrets are exposed—for example, by storing credentials in source code;
- Rotating secrets is an important security consideration, but is rarely mandated;
- Applications are at risk over time as the secret is reused;
- Changing the secret may cause interruptions in service;
- Ecosystem complexity grows as more applications and resources participate;
- Calling applications have increased complexity—they must register, acquire and maintain multiple secrets/tokens because each authorization server maintains its own list of calling application identities;
- Authorization servers duplicate the registration of the calling application as they each have a separate identity/registration for the calling application; and
- Creation of the Security Token always has a single point of failure at the Authorization Server.

SUMMARY

Therefore, what is needed are improved methods and systems for API security and authentication that overcomes the above-referenced challenges and deficiencies. The methods and systems described herein advantageously use decentralized identifiers (DIDs) and DID Authentication (DID-Auth) techniques to approach API security and authentication in a different way from the approaches described above. The present methods and systems utilize an identity fabric blockchain element that is configured to register client applications, store a DID and public key pair for each client application, and provide verification of the client applications to system resources that need to authenticate requests (e.g., API requests) submitted by the client applications.

As can be appreciated, the systems and methods described herein beneficially provide for a single representation of identity that is owned and maintained by the entity itself, thereby eliminating the need to manage multiple copies of the same entity in each silo and reducing the number of credentials maintained by the client application. The techniques also utilize asymmetric cryptography and the decentralized identity fabric blockchain for managing identity and associated public keys for proofs, which eliminates the need for shared secrets for authentication to demonstrate ownership of the identity and also eliminates the accompanying security issues as described previously. Finally, the decentralized identity fabric used by the present systems and methods advantageously provides the opportunity to use the assertion as the security token (i.e. bring your own token), eliminating the single point of failure of an authorization server.

The invention, in one aspect, features a computerized method of authenticating client applications using an identity fabric blockchain. A server computing device receives a first registration request from a first client application. The server computing device generates a first decentralized identifier corresponding to the first client application. The server computing device stores the first decentralized identifier in an identity fabric blockchain. The server computing device receives a second registration request from a second client application. The server computing device generates a second decentralized identifier corresponding to the second client application. The server computing device stores the second decentralized identifier in the identity fabric blockchain. The server computing device receives a first authentication request from a first resource associated with a first entity. The server computing device authenticates the first client application based on the first authentication request and the first decentralized identifier stored in the identity fabric blockchain. The server computing device receives a second authentication request from a second resource associated with a second entity. The server computing device authenticates the second client application based on the second authentication request and the second decentralized identifier stored in the identity fabric blockchain.

The invention, in another aspect, features a system for authenticating client applications using an identity fabric blockchain. The system includes a server computing device having a memory for storing computer-executable instructions and a processor that executes the computer-executable instructions. The server computing device receives a first registration request from a first client application. The server computing device generates a first decentralized identifier corresponding to the first client application. The server computing device stores the first decentralized identifier in an identity fabric blockchain. The server computing device receives a second registration request from a second client application. The server computing device generates a second decentralized identifier corresponding to the second client application. The server computing device stores the second decentralized identifier in the identity fabric blockchain. The server computing device receives a first authentication request from a first resource associated with a first entity. The server computing device authenticates the first client application based on the first authentication request and the first decentralized identifier stored in the identity fabric blockchain. The server computing device receives a second authentication request from a second resource associated with a second entity. The server computing device authenticates the second client application based on the second authentication request and the second decentralized identifier stored in the identity fabric blockchain.

Any of the above aspects can include one or more of the following features. In some embodiments, generating the first decentralized identifier comprises generating a first public-private key pair. In some embodiments, the server computing device is configured to store a public key of the first public-private key pair associated with the first decentralized identifier in the identity fabric blockchain. In some embodiments, the first authentication request comprises the public key of the first public-private key pair associated with the first decentralized identifier.

In some embodiments, generating the second decentralized identifier comprises generating a second public-private key pair. In some embodiments, the server computing device is configured to store a public key of the second public-private key pair associated with the second decentralized identifier in the identity fabric blockchain. In some embodiments, the second authentication request comprises the public key of the second public-private key pair associated with the second decentralized identifier.

In some embodiments, the first resource comprises a first application programming interface corresponding to the first entity and the second resource comprises a second application programming interface corresponding to the second entity. In some embodiments, authenticating the first client application based on the first authentication request comprises granting access to the first application programming interface corresponding to the first entity. In some embodiments, authenticating the second client application based on the second authentication request comprises granting access to the second application programming interface corresponding to the second entity.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
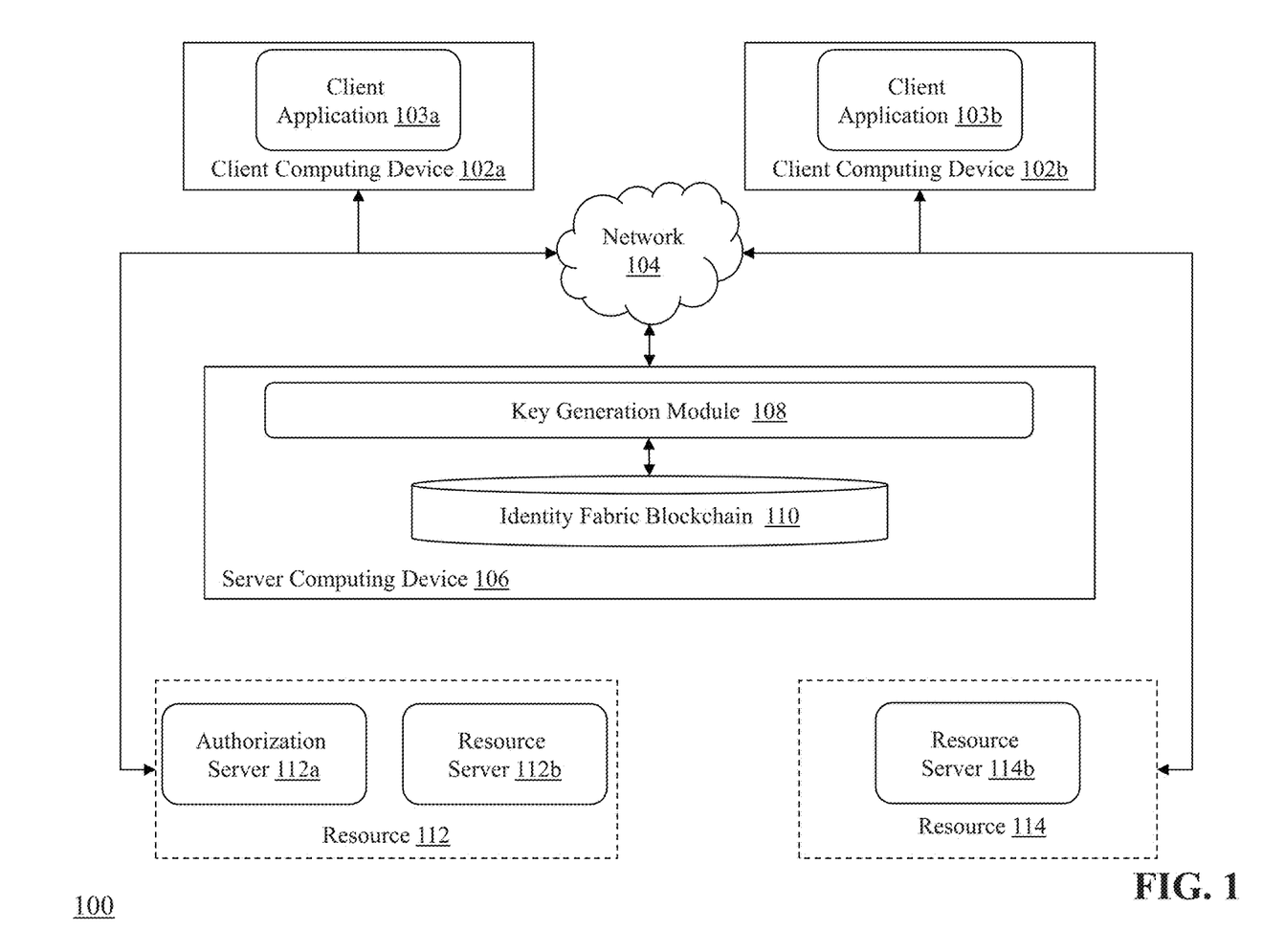
FIG. 1 is a block diagram of a system for authenticating client applications using an identity fabric blockchain.

FIG. 1 is a block diagram of a system 100 for authenticating client applications using an identity fabric blockchain. The system 100 includes one or more client computing devices (e.g., client devices 102a-102b) that are coupled via communications network 104 to the server computing device 106. Each client computing device 102a, 102b comprises a client software application 103a, 103b respectively. The server computing device 106 includes a key generation module 108 and an identity fabric blockchain 110. The server computing device 106 is further coupled to one or more remote computing resources (e.g., resources 112, 114). The remote computing resource 112 comprises an authorization server 112a and a resource server 112b, while the remote computing resource 114 comprises a resource server 114b.

The client computing devices 102a, 102b connect to the communications network 104 in order to communicate with the server computing device 106 to provide input and receive output relating to the process of authenticating client applications using an identity fabric blockchain as described herein. The client software application 103a, 103b of each client computing device 102a, 102b is configured to receive input from a user of the client computing device and transmit requests to interact with or otherwise execute functionality associated with one or more of the remote computing resources 112, 114. For example, the client software applications 103a, 103b can issue, e.g., an application programming interface (API) call to one or more of the remote computing resources 112, 114 in order to retrieve data from the resource(s) 112, 114. In some embodiments, each of the client computing devices 102a, 102b is coupled to a display device (not shown). For example, the client computing devices 102a, 102b can provide a detailed graphical user interface (GUI) via the display device (e.g., via client applications 103a, 103b) that presents output resulting from the methods and systems described herein, where the GUI is utilized by an operator of the respective devices 102a, 102b to review data and/or issue commands associated with the process of authenticating client applications using an identity fabric blockchain.

Exemplary client devices 102a, 102b include but are not limited to desktop computers, laptop computers, tablets, mobile devices, smartphones, and internet appliances. It should be appreciated that other types of computing devices that are capable of connecting to the components of the system 100 can be used without departing from the scope of invention. Although FIG. 1 depicts two client devices 102a, 102b, it should be appreciated that the system 100 can include any number of client devices.

The communication network 104 enables the other components of the system 100 to communicate with each other in order to perform the process of authenticating client applications using an identity fabric blockchain as described herein. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The server computing device 106 is a computing device comprising a combination of hardware, including one or more special-purpose processors and one or more physical memory modules, and specialized software modules—such as key generation module 108 and identity fabric blockchain 110—that execute on the processor of the server computing device 106, to receive data from other components of the system 100, transmit data to other components of the system 100, and perform functions for authenticating client applications using an identity fabric blockchain as described herein.

In some embodiments, the modules 108 and 110 are specialized sets of computer software instructions programmed onto one or more dedicated processors in the server computing device 106 and can include specifically-designated memory locations and/or registers for executing the specialized computer software instructions. In some embodiments, the identity fabric blockchain 110 comprises a special-purpose memory/storage module configured using a distributed ledger structure, where the blockchain 110 comprises a list of records that are linked together using cryptography. In some embodiments, the blockchain 110 comprises a plurality of nodes that maintain a blockchain comprising the DID/public key pairs as described herein. Further explanation of the specific processing performed by the modules 108 and 110 will be provided below.

The remote computing resources 112, 114 are computing devices or platforms that provide access to data and/or functionality stored or hosted by the remote computing resources to one or more client computing devices 102a, 102b upon request. In some embodiments, this request takes the form of an API call issued by the client computing devices 102a, 102b, that is received and processed by one or more of the remote computing resources 112, 114 to which the API call is directed or addressed. For example, a client software application on a client computing device can generate and transmit an API call to one or more of the remote computing resources as part of executing a software workflow (e.g., to retrieve data, to execute a transaction, etc.). As shown in FIG. 1, remote computing resource 112 comprises an authorization server 112a and a resource server 112b, while remote computing resource 114 comprises a resource server 114b. The authorization server 112a provides functionality for authorizing client applications to access the resource server 112b. As can be appreciated, the authorization techniques described herein can be performed using a few different models: a first model is to reuse an existing authorization server (e.g., server 112a) for issuing runtime tokens, while a second model is a 'bring-your-own-token' approach that does not require the use of an existing authorization server—instead the assertion made by the client application to the resource server (e.g., server 114b) can be used as the security token for purposes of authorization.

Typically, prior to providing a response to the request, the remote computing resources require that the client software application is authorized as being entitled to access the remote computing resource. As will be explained herein, the methods and systems of the present disclosure provide for a mechanism for registration and authorization of the client application using a DID-public key pair that is generated by the server computing device (and/or the client computing device) and stored in the identity fabric blockchain. In some embodiments, each of the remote computing resources 112, 114 is associated with a different entity (e.g., an application server, an organization, a service provider, a data warehouse platform, etc.).

Figure 2:
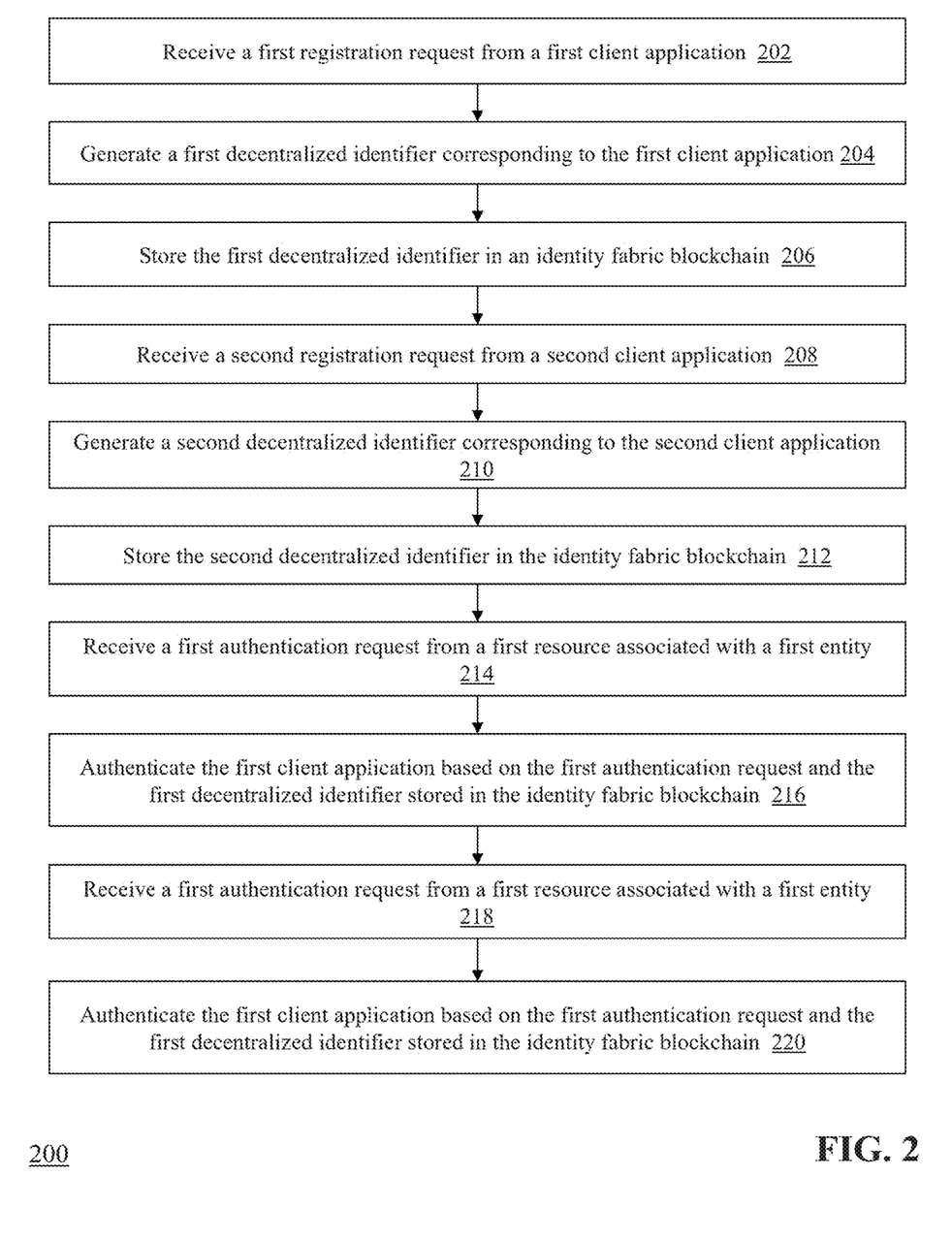
FIG. 2 is a flow diagram of a computerized method of authenticating client applications using an identity fabric blockchain.

FIG. 2 is a flow diagram of a computerized method 200 of authenticating client applications using an identity fabric blockchain, using the system 100 of FIG. 1. The decentralized identifier generation module 108 of server computing device 106 receives (step 202) a first registration request from a first client application (e.g., client application 103a of client computing device 102a). As can be appreciated, the client software application can comprise source code that invokes or calls an application programming interface in order to interface with another computing system or resource (i.e., remote computing resources 114a, 114b). For example, an API call can comprise a function that creates and issues a request (e.g., via HTTP or HTTPS) to the remote computing system for retrieval of data. Prior to issuing an API call to a remote resource, the client application 103a of client computing device 102a can register to the authentication framework by establishing a connection to the server computing device 106 for generation of a decentralized identifier that is stored in the identity fabric blockchain 110.

The key generation module 108 generates (step 204) a decentralized identifier (DID) corresponding to the client application 103a. In some embodiments, the DID is associated with a private key-public key pair that is used to register the client application to the authentication framework and execute authorization requests as part of communications with resources 112, 114. For example, upon first installation, the client application 103a can be configured to communicate with key generation module 108 for generation of an asymmetric public key-private key pair (e.g., using key generation module 108) for use in decentralized authentication as described herein. In some embodiments, the key generation module 108 can be based upon Cloud-HSM™ provided by Amazon Web Services (AWS). In some embodiments, the asymmetric public key-private key pair generated by the key generation module 108 is a 3072-bit or 4096-bit Rivest-Shamir-Adleman (RSA) encryption key. The private key is stored locally on the client computing device 102a (e.g., as part of the client application 103a) while the public key is provided to the identity fabric blockchain 110 for storage (as part of a DID record) and for use in subsequent authorization requests.

As mentioned above, during the registration request, the public key created by the key generation module 108 is provided to the identity fabric blockchain 110 for storage, causing the identity fabric blockchain 110 to generate a DID record in the blockchain that is unique to the client application 103a. The identity fabric blockchain 110 stores (step 206) the public key for the application 103a as part of the DID record in the blockchain 110. In some embodiments, the identity fabric blockchain 110 is a ION™ blockchain implementation (as described at identity.foundation/ion/, which is incorporated herein by reference). ION uses Bitcoin™-based blockchain electronic ledger technology to isolate and store credential information, such as the public key and DID described above, in a decentralized fashion.

The client application 103b of client computing device 102b registers to the authentication framework in the same way as the client application 103a, by establishing a connection to the server computing device 106 for generation of a DID and storage of the DID in the blockchain 110. More specifically, the server computing device 106 receives (step 208) a registration request from the client application 103b and generates (step 210) a DID corresponding to the client application 103b (i.e., public key-private key pair) by the key generation module 108. The identity fabric blockchain 110 stores (step 212) the generated public key in a DID record that is unique to the client application 103b and the private key is stored locally on client computing device 102b.

Figure 3:
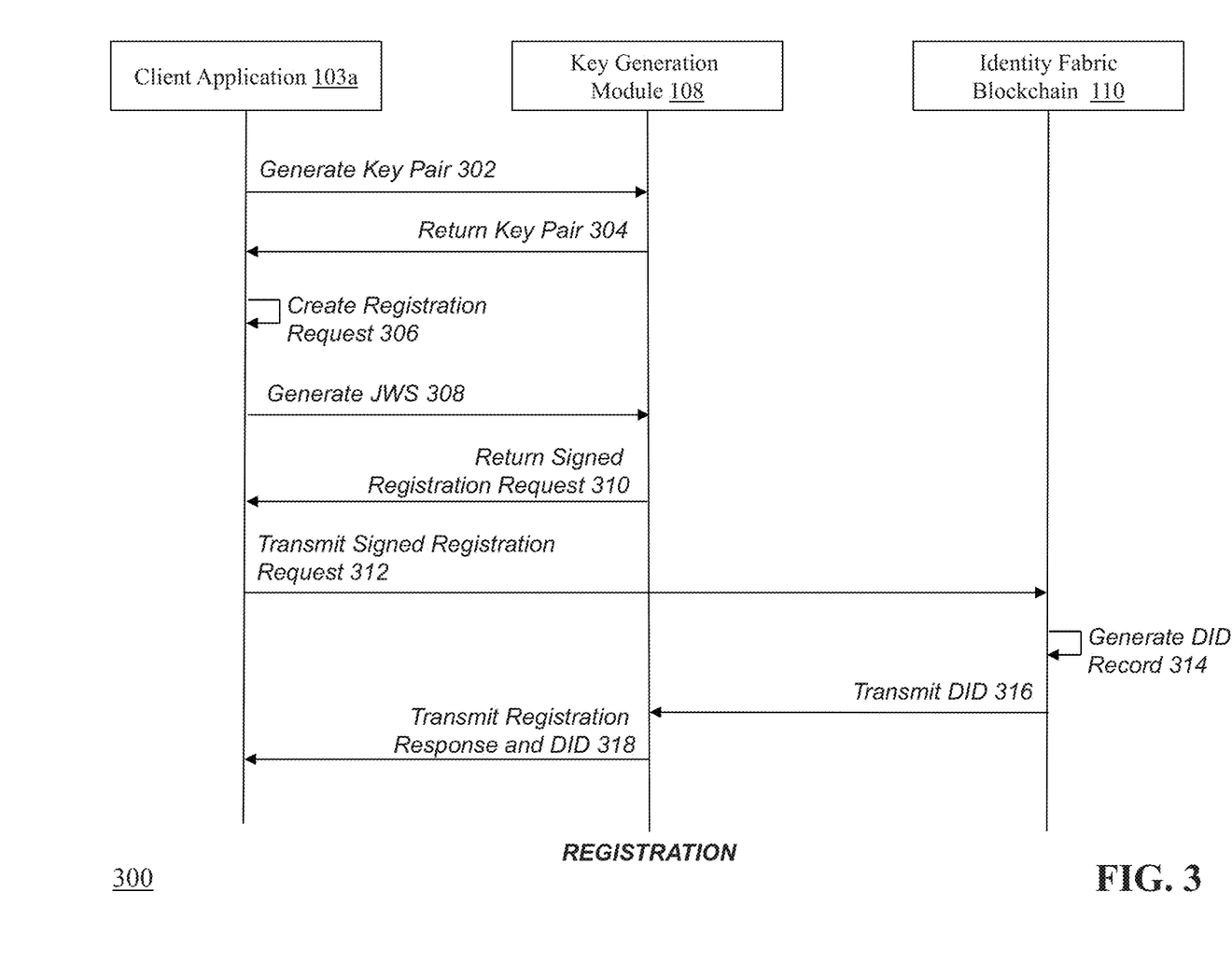
FIG. 3 is a workflow ladder diagram of an exemplary client application registration process.

FIG. 3 is a workflow ladder diagram of an exemplary client application registration process 300. As shown in FIG. 3, at step 302 a client application (e.g., application 103a) transmits a request to key generation module 108 to generate a key pair. At step 304, the key generation module 108 generates the public key-private key pair and returns the key pair to the client application 103a. At step 306, the client application 103a creates the registration request. At step 308, the client application 103a transmits a request to the key generation module 108 to generate a JSON Web Signature (JWS) for signing the registration request. At step 310, the key generation module 108 signs the registration request and returns the signed registration request to the client application 103a. At step 312, the client application 103a transmits the signed registration request to the identity fabric blockchain 110. At step 314, the identity fabric blockchain 110 generates a DID record using the public key in the registration request and stores the DID record in the blockchain. In some embodiments, the DID record includes the public key. At step 316, the identity fabric blockchain 110 transmits the generated DID to the key generation module 108. At step 318, the key generation module 108 returns a response to the registration request to the client application 103a along with the DID for persistence at the client application 103a.

After the client applications 103a, 103b are registered to the authentication framework as described above, the system 100 can use the DID record stored in the blockchain 110 for authenticating the client applications 103a, 103b during requests for resources from resource(s) 112, 114. As described previously, the authentication framework can be implemented using one or more different authentication models, such as (i) a model of reusing existing authorization servers for tokens and (ii) a 'bring-your-own' token model. For purposes of this specification, the client application 103a will be described as being authenticated using the existing authorization servers model while the client application 103b will be described as being authenticated using the 'bring-your-own' token model. However, it should be appreciated that any client application 103a, 103b can leverage either authentication model (and/or other authentication models that may be contemplated for use with the methods and systems described herein).

Continuing with FIG. 2, the client application 103a transmits an authorization request for access to resource server 112b (e.g., via an API call) to resource 112. The request includes the public key from the previously-generated private key-public key pair and/or the DID. The authorization server 112a receives the authorization request for access from the client application 103a and transmits the authorization request to the identity fabric blockchain 110 in order to authenticate the client application 103a. The identity fabric blockchain receives (step 212) the authorization request from the authorization server 112a and authenticates (step 214) the authorization request. In some embodiments, the identity fabric blockchain 110 authenticates the authorization request by comparing the public key and/or DID in the authorization request to the DID records stored in the blockchain 110. When the blockchain 110 confirms that the DID/public key is validly stored therein, the blockchain 110 considers the authorization request as authenticated. Upon authenticating the authorization request, the authorization server 112a generates a token (e.g., OAuth token) for the client application 103a and returns the token to the client application 103a. The client application 103a then establishes a connection to the resource server 112b and provides the token to the resource server 112 in order to receive access to the requested resource(s).

Figure 4:
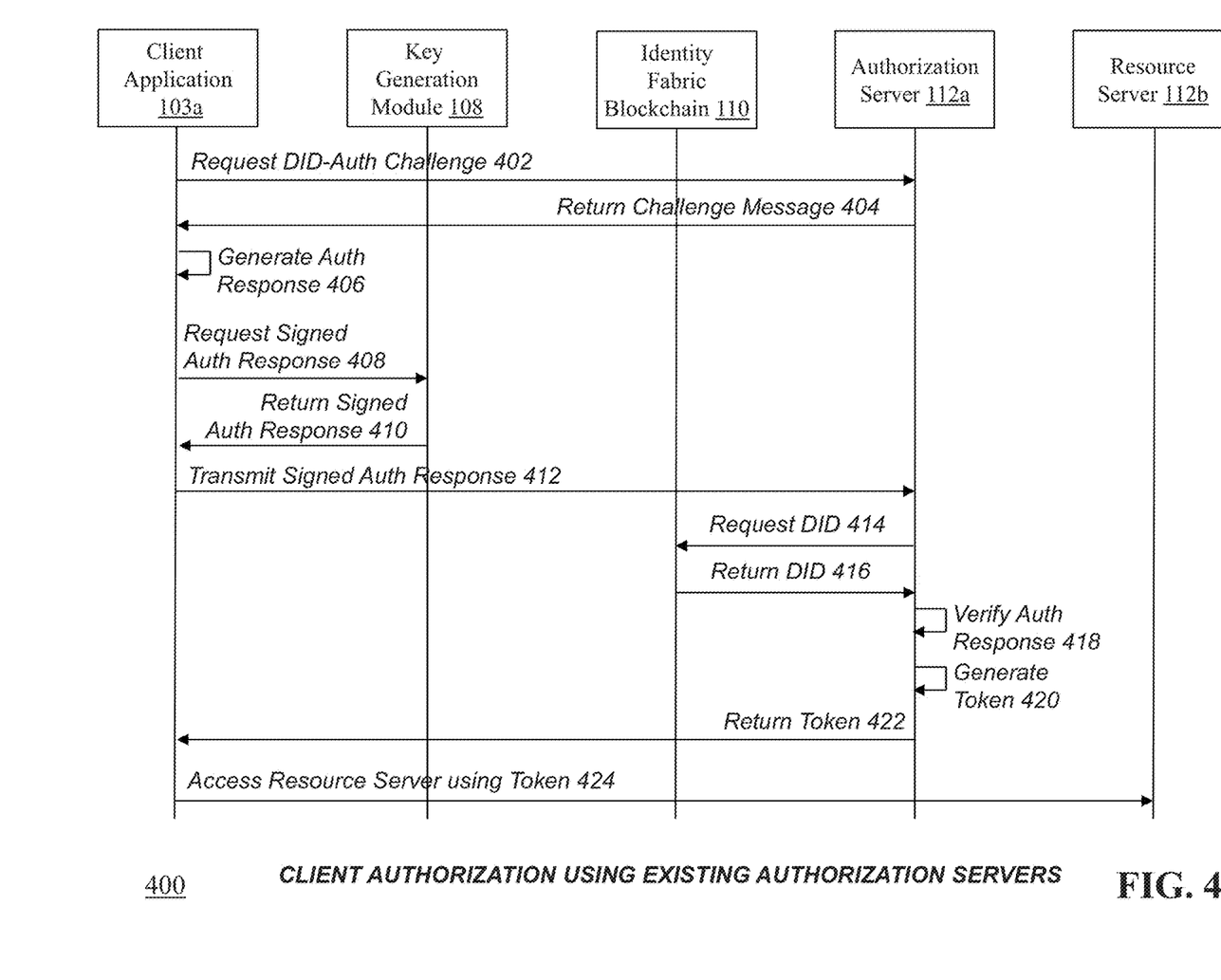
FIG. 4 is a workflow ladder diagram of an exemplary client authentication process using existing authorization servers.

FIG. 4 is a workflow ladder diagram of an exemplary client authentication process 400 using existing authorization servers. As shown in FIG. 4, at step 402 the client application 103a requests a DID-Auth Challenge from the authorization server 112a of resource 112. At step 404, the authorization server 112a returns a Challenge message to the client application 103a. At step 406, the client application 103a generates an authentication response to the Challenge message. At step 408, the client application 103a requests a signed authentication response from the key generation module 108. At step 410, the key generation module 108 signs the authentication response (e.g., using the public key for the client application) and returns the signed authentication response to the client application 103a. At step 412, the client application 103a transmits the signed authentication response to the authorization server 112a. At step 414, the authorization server 112a requests the DID/public key from the identity fabric blockchain 110. At step 416, the identity fabric blockchain 110 returns the DID/public key to the authorization server 112a. At step 418, the authorization server 112a verifies the signed authentication response using the DID from the blockchain. At step 420, the authorization server 112a generates a token (e.g., OAuth token) for the client application 103a. At step 422, the authorization server 112a returns the generated token to the client application 103a. At step 424, the client application 103a accesses the resource server 112b using the token received from the authorization server—for example, the client application 103a can invoke an API call to the resource server 112b that includes the token. The resource server 112b can validate the token and grant access to the client application 103a.

Turning back to FIG. 1, the client application 103b of client computing device 102b uses the 'bring-your-own' token model to authenticate to the resource server 114b of resource 114. The client application 103b transmits an authorization request for access to resource server 114b (e.g., via an API call) to resource 114. The request includes the public key from the previously-generated private key-public key pair and/or the DID. The resource server 114b receives the authorization request for access from the client application 103b and transmits the authorization request to the key generation module 108 in order to authenticate the client application 103b using the identity fabric blockchain 110. The key generation module 108 receives (step 216) the authorization request from the resource server 114b and authenticates (step 218) the authorization request. In some embodiments, the key generation module 108 authenticates the authorization request by comparing the public key and/or DID in the authorization request to the DID records stored in the identity fabric blockchain 110. In other embodiments, the resource server 114b can interface directly with the identity fabric blockchain 110 in order to validate the DID/public key received in the authorization request (instead of using the key generation module 108 as an intermediary). When the blockchain 110 confirms that the DID/public key is validly stored therein, the blockchain 110 returns a message to the key generation module 108 (and/or the resource server 114b), which then considers the authorization request as authenticated. Upon authenticating the authorization request using the key generation module 108 and the identity fabric blockchain 110 as described above, the resource server 114b grants access to the requested resource(s) to the client application 103b. As can be appreciated, this authentication model does not utilize an existing authorization server structure to generate OAuth tokens in order to grant access to resources to the client application. Instead, the resource server can use the key generation module 108 as an authentication proxy and/or directly utilize the identity fabric blockchain 110 as the authority for the DID/key material used in any authentication of messages (e.g., to authenticate the client application and grant access to the requested resources). As mentioned previously, this model eliminates the single point of failure of an authorization server and enables seamless and continuous authentication of access requests.

Figure 5:
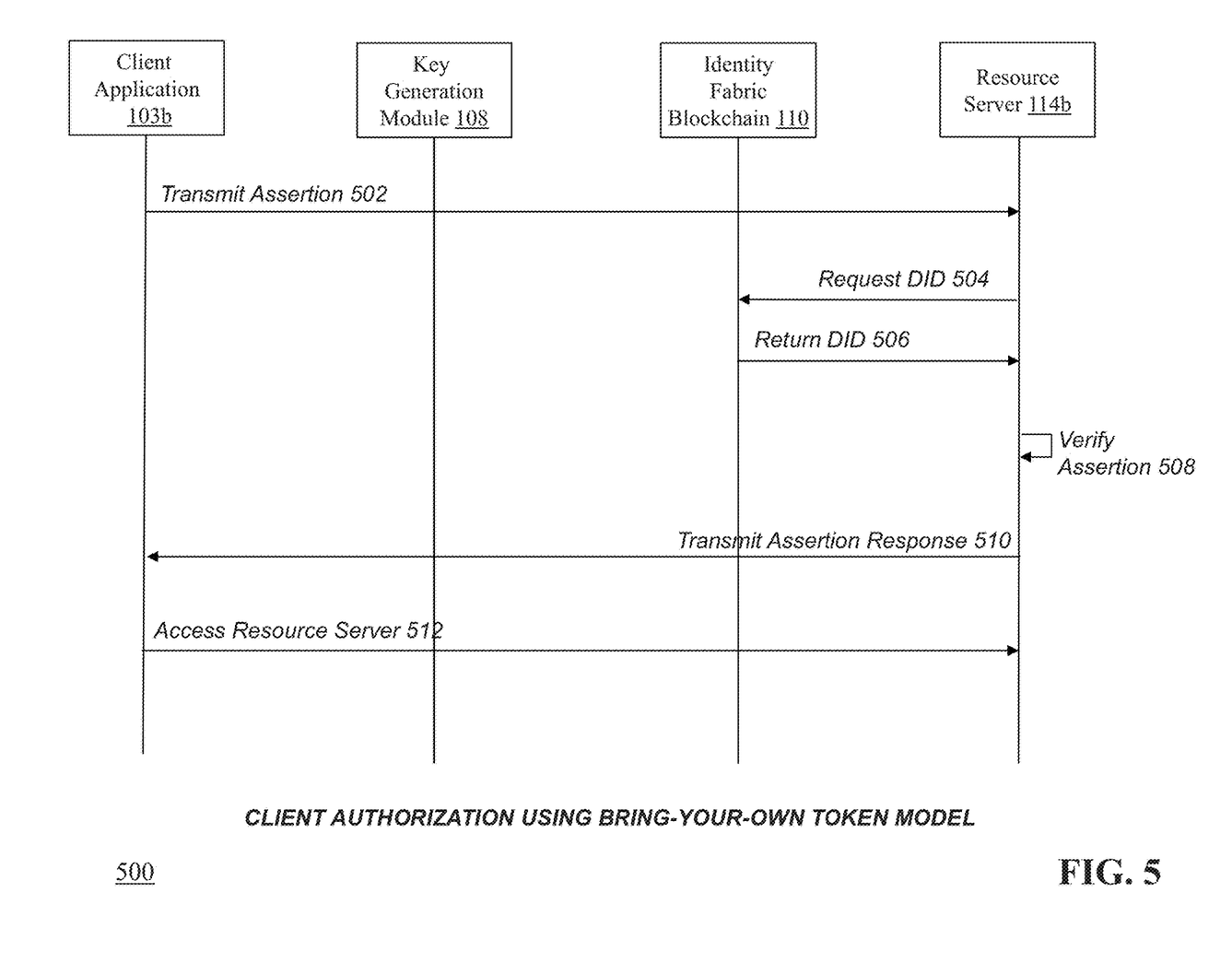
FIG. 5 is a workflow ladder diagram of an exemplary client authentication process using a bring-your-own token model.

FIG. 5 is a workflow ladder diagram of an exemplary client authentication process 500 using a bring-your-own token model, using the system 100 of FIG. 1. As shown in FIG. 5, at step 502 the client application 103b transmits an authentication request (e.g., an assertion) to the resource server 114b at resource 114. The authentication request includes the DID/public key for the client application 103b. At step 504, the resource server 114b requests the DID record from the identity fabric blockchain 110. As mentioned above, in alternative embodiments the resource server 114b can utilize the key generation module 108 as a proxy for accessing the identity fabric blockchain 110 but this is not required. At step 506, the identity fabric blockchain 110 returns the DID record to the resource server 114b. At step 508, the resource server 114b verifies the assertion using the DID record retrieved from the blockchain 110. Upon verifying that the assertion is authenticated and the client application 103b is authorized for access, at step 510 the resource server 114b transmits a response to the assertion to the client application 103b. At step 512, the client application 103b connects to the resource server 512 (e.g., using an API call) to access the desired data and/or functionality.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method for authenticating client applications using an identity fabric blockchain, the method comprising:

generating, by a key generation module of the server computing device, a first decentralized identifier corresponding to a first client application of a first client device from which a first registration request is received, the first registration request including a public key associated with a first key pair wherein a private key of the first key pair is stored on the first client device;

storing, by the key generation module of the server computing device, the first decentralized identifier in an identity fabric blockchain, comprising generating a first record in the blockchain that includes the first public key and the first decentralized identifier;

generating, by the key generation module of the server computing device, a second decentralized identifier corresponding to a second client application of a second client device from which a second registration request is received, the second registration request including a public key associated with a second key pair wherein a private key of the second key pair is stored on the second client device;

storing, by the key generation module of the server computing device, the second decentralized identifier in the identity fabric blockchain, comprising generating a second record in the blockchain that includes the second public key and the second decentralized identifier;

authenticating, an authorization server associated with a first remote resource server, the first client application based on a first authentication request received from the first client device and the first decentralized identifier stored in the identity fabric blockchain, comprising:

executing an authentication challenge routine that causes the first client device to request an authorization challenge from the authorization server, receive a challenge message from the authorization server, generate an authentication response to the challenge message, request that the key generation module sign the authentication response using the first public key, and transmit the signed authentication response to the authorization server, requesting the first decentralized identifier from the identify fabric blockchain using the signed authentication response, verifying the signed authentication response using the first decentralized identifier, and generating an authentication token for transmission to the first client application, the token used by the first client application to access the first remote resource server; and authenticating, by a second remote resource server, the second client application based on a second authentication request received from the second client device and the second decentralized identifier stored in the identity fabric blockchain, comprising:

requesting the second decentralized identifier indirectly from the identity fabric blockchain via the key generation module as a proxy, using the second public key as included in the second authentication request, verifying the second authentication request using the second decentralized identifier, and transmitting an authentication response to the second client application that enables the second client application to access the second remote resource server without the server computing device generating a separate authentication token.

2. The computerized method of claim 1, wherein the first remote resource server comprises a first application programming interface called by the first client application and the second remote resource server comprises a second application programming interface called by the second client application.

3. The computerized method of claim 2, wherein authenticating the first client application based on the first authentication request comprises granting access to the first application programming interface based upon the authentication token.

4. The computerized method of claim 2, wherein authenticating the second client application based on the second authentication request comprises granting access to the second application programming interface based upon the authentication response.

5. A system for authenticating client applications using an identity fabric blockchain, the system comprising:
   a server computing device communicatively coupled to a first client application on a first client device and a second client application on a second client device over a network,
   an authorization server associated with a first remote resource server, and
   a second remote resource server,
   wherein a key generation module of the server computing device:
      generates a first decentralized identifier corresponding to the first client application from which a first registration request is received, the first registration request including a public key associated with a first key pair wherein a private key of the first key pair is stored on the first client device;
      stores the first decentralized identifier in an identity fabric blockchain, comprising generating a first record in the blockchain that includes the first public key and the first decentralized identifier;
      generates a second decentralized identifier corresponding to the second client application from which a second registration request is received, the second registration request including a public key associated with a second key pair wherein a private key of the second key pair is stored on the second client device; and
      stores the second decentralized identifier in the identity fabric blockchain, comprising generating a second record in the blockchain that includes the second public key and the second decentralized identifier;
   wherein the authorization server authenticates the first client application based on a first authentication request received from the first client device and the first decentralized identifier stored in the identity fabric blockchain, comprising:
      executing an authentication challenge routine that causes the first client device to request an authorization challenge from the authorization server, receive a challenge message from the authorization server, generate an authentication response to the challenge message, request that the key generation module sign the authentication response using the first public key, and transmit the signed authentication response to the authorization server,
      requesting the first decentralized identifier from the identify fabric blockchain using the signed authentication response,
      verifying the signed authentication response using the first decentralized identifier, and
      generating an authentication token for transmission to the first client application, the token used by the first client application to access the first remote resource server; and
   wherein the second remote resource server authenticates, the second client application based on a second authentication request received from the second client device and the second decentralized identifier stored in the identity fabric blockchain, comprising:
      requesting the second decentralized identifier indirectly from the identity fabric blockchain via the key generation module as a proxy, using the second public key as included in the second authentication request,
      verifying the second authentication request using the second decentralized identifier, and
      transmitting an authentication response to the second client application that enables the second client application to access the second remote resource server without the server computing device generating a separate authentication token.

6. The system of claim 5, wherein the first resource comprises a first application programming interface called by the first client application and the second remote resource server comprises a second application programming interface called by the second client application.

7. The system of claim 6, wherein authenticating the first client application based on the first authentication request comprises granting access to the first application programming interface based upon the authentication token.

8. The system of claim 6, wherein authenticating the second client application based on the second authentication request comprises granting access to the second application programming interface based upon the authentication response.

9. The method of claim 1, wherein the authentication token comprises an OAuth token.

10. The method of claim 1, wherein the second authentication request comprises an OAuth assertion.

11. The system of claim 5, wherein the authentication token comprises an OAuth token.

12. The system of claim 5, wherein the second authentication request comprises an OAuth assertion.

13. The method of claim 1, wherein the identity fabric blockchain confirms that the first decentralized identifier is validly stored in the blockchain prior to returning the first decentralized identifier to the authorization server and the identity fabric blockchain confirms that the second decentralized identifier is validly stored in the blockchain prior to returning the second decentralized identifier to the second remote resource server.

14. The system of claim 5, wherein the identity fabric blockchain confirms that the first decentralized identifier is validly stored in the blockchain prior to returning the first decentralized identifier to the authorization server and the identity fabric blockchain confirms that the second decentralized identifier is validly stored in the blockchain prior to returning the second decentralized identifier to the second remote resource server.

* * * * *